U. A. Boyden,
Water Wheel,
Nº 5,144. Patented June 5, 1847.

Horizontal Section on H' I'

Witnesses.
Barnabas Whitney
Geo. Clark

Inventor
Uriah Atherton Boyden

Sheet 4-5 Sheets

U. A. Boyden,
Water Wheel,

№ 5,144.          Patented June 5, 1847.

Horizontal Section on E F.

Elevation of Disc and Leading Curves.

Witnesses:
Barnabas Whitney
George Stark

Inventor:
Uriah Atherton Boyden

Sheet 5-5 Sheets
U. A. Boyden,
Water Wheel
No. 5,144.    Patented June 5, 1847.
Horizontal Section on L' M'
Fig. 4
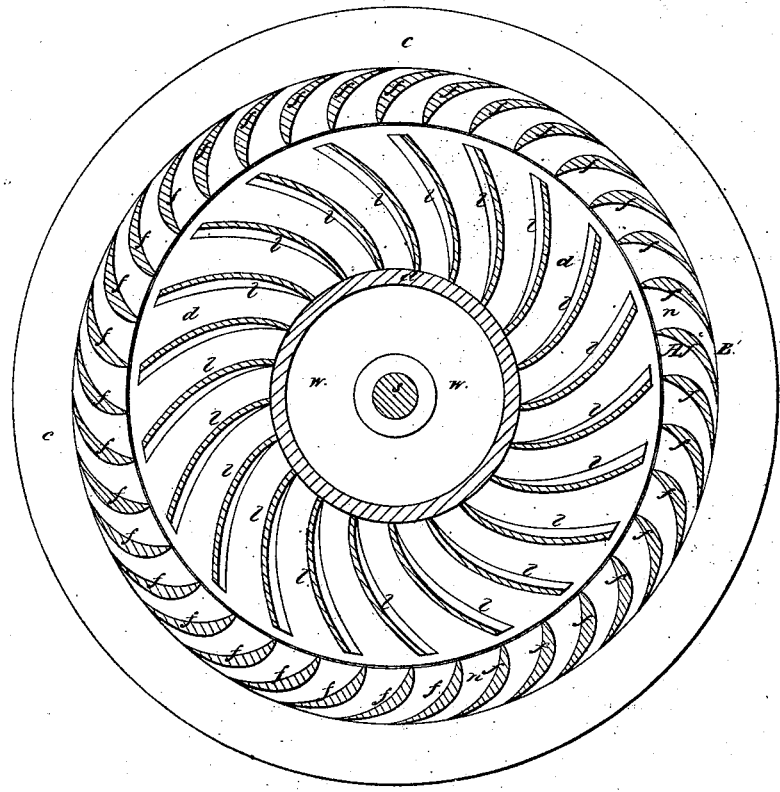
Elevation of one of the Leading curves.
Fig: 5.
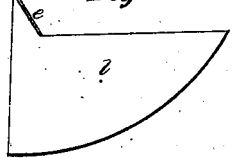
Witnesses:
Barnabas Whitney
George Stark
Inventor:
Uriah Atherton Boyden

UNITED STATES PATENT OFFICE.

URIAH ATHERTON BOYDEN, OF BOSTON, MASSACHUSETTS.

IMPROVEMENT IN WATER-WHEELS.

Specification forming part of Letters Patent No. 5,144, dated June 5, 1847.

*To all whom it may concern:*

Be it known that I, URIAH ATHERTON BOYDEN, of Boston, in the county of Suffolk and State of Massachusetts, have invented new and useful improvements whereby the efficiency of water in actuating turbines and reacting water-wheels is increased and the liability to accidents diminished.

I will briefly explain the annexed drawings before describing my improvements.

Figure 1:
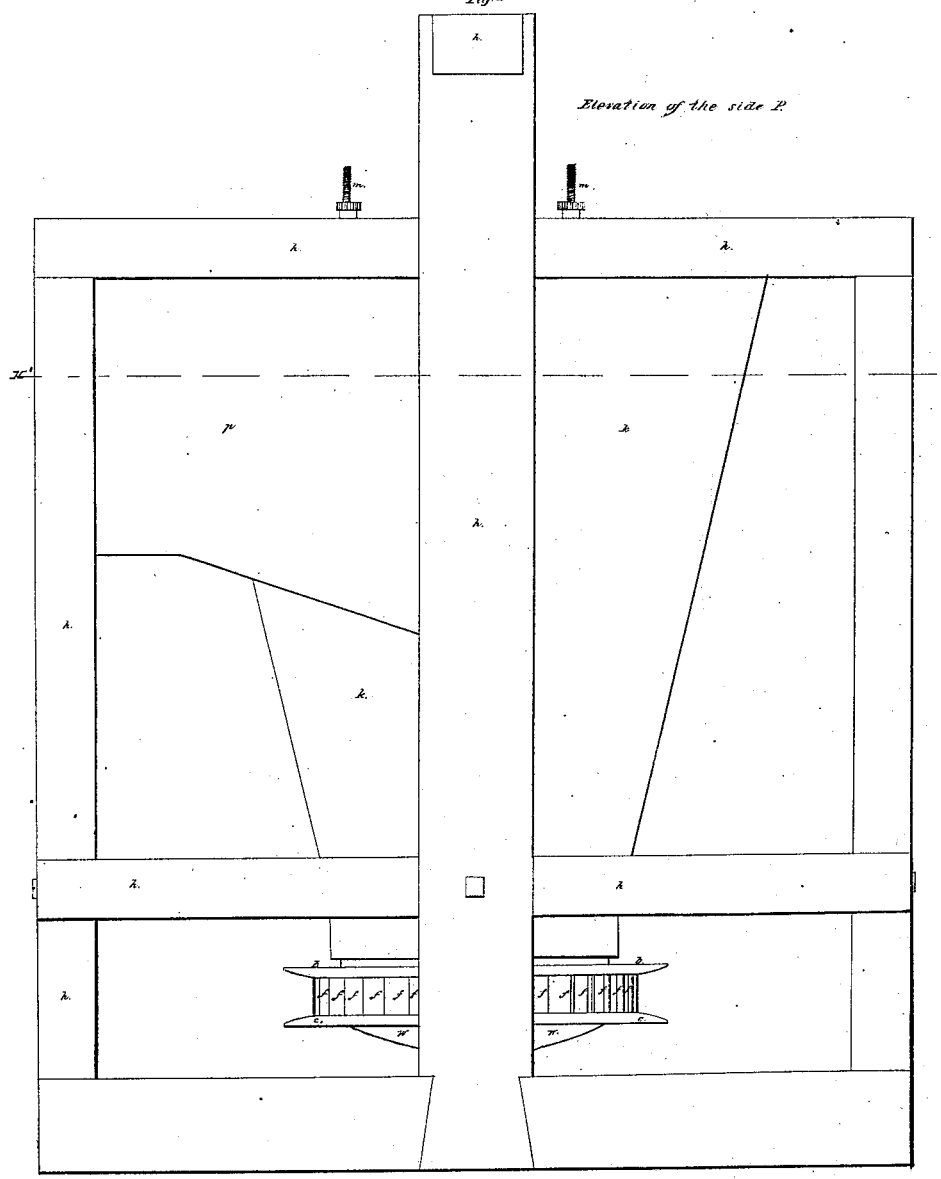
Figure 2:
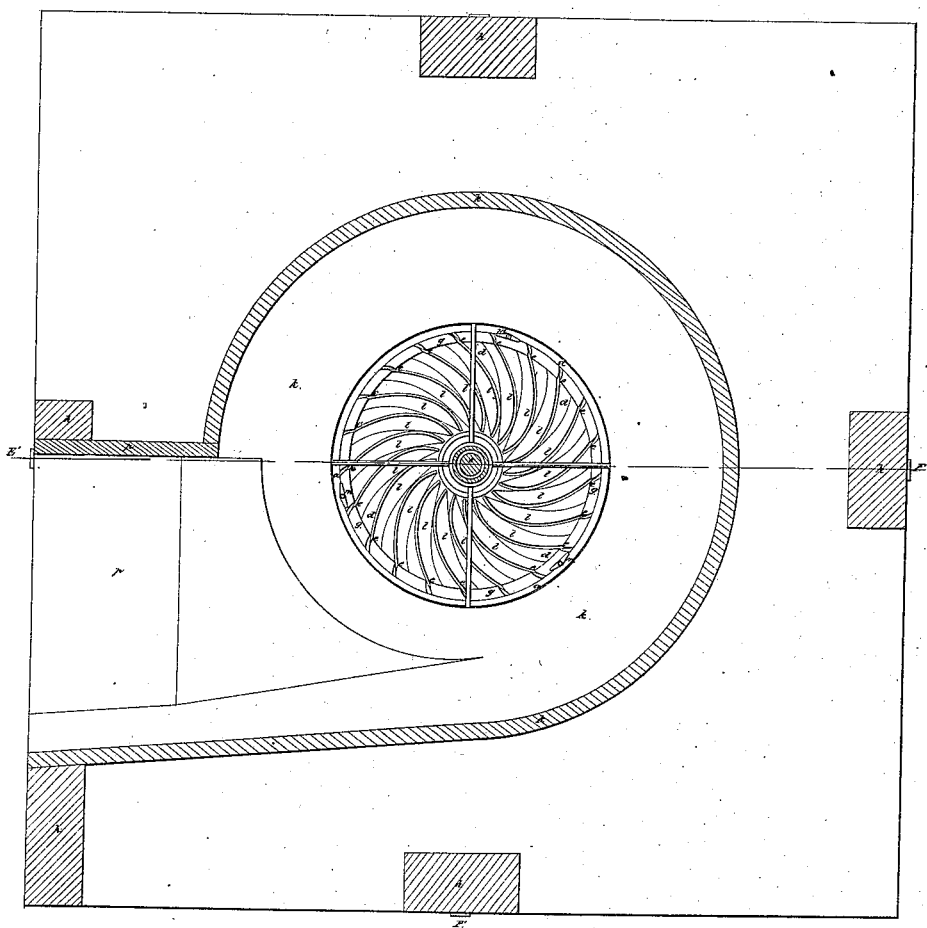
Figure 3:
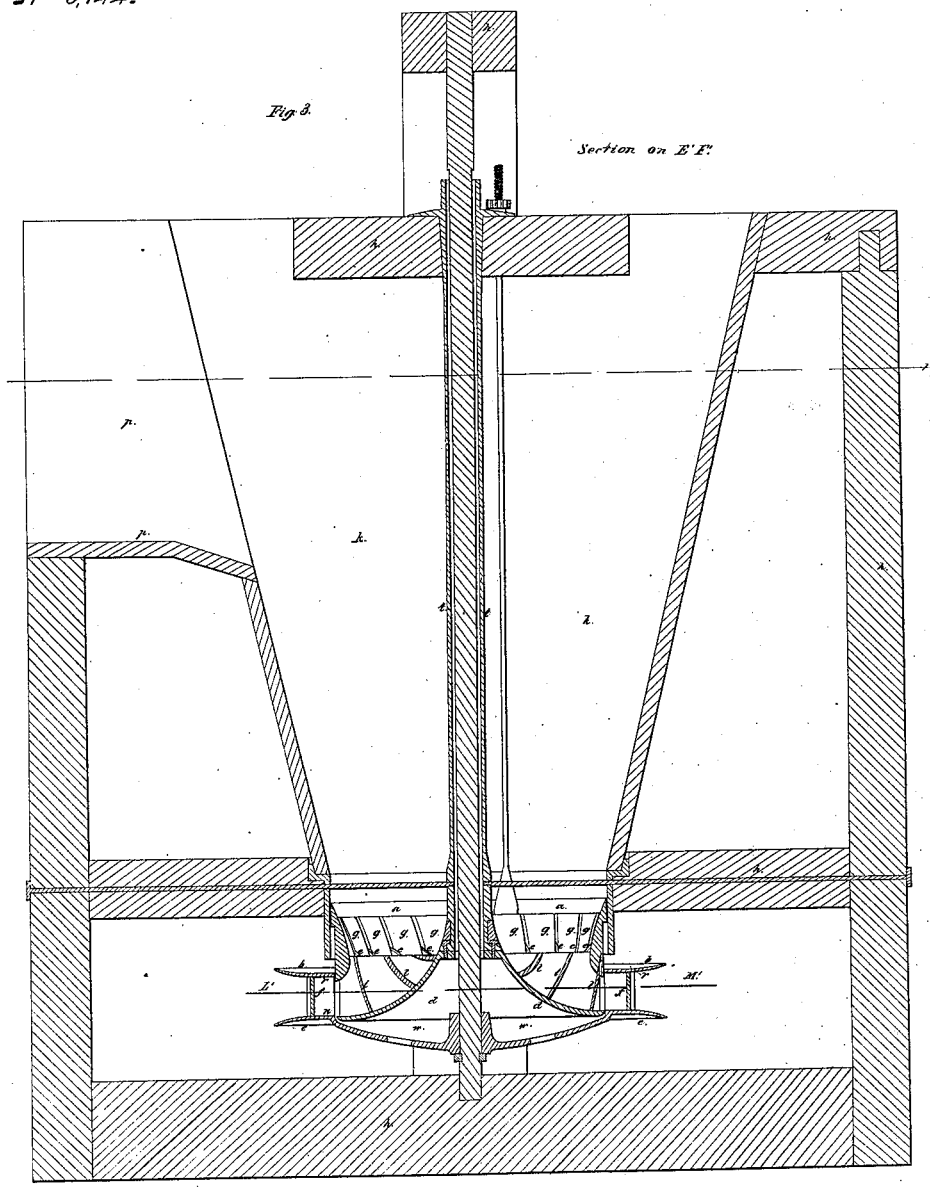
Figure 4:
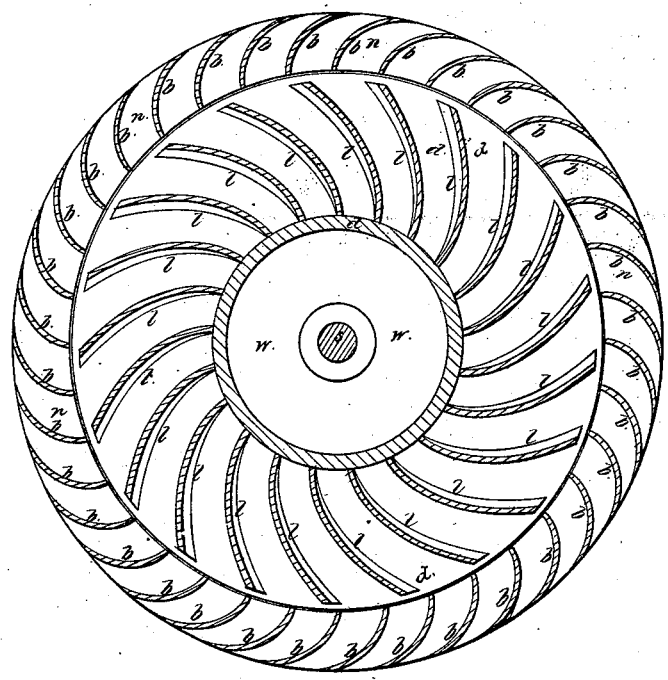
Figure 5:
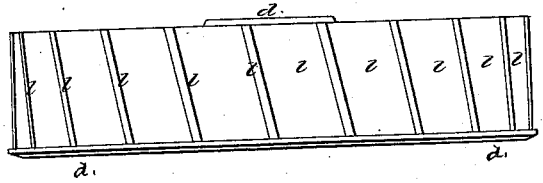

Figure 1 is an elevation of the turbines, the flume, and the frame which supports them. Fig. 2 is a horizontal section through so near the top of the flume as to show the greater portion in plan. Fig 3 is a vertical section through the center of the turbine, its flume, and the frame which supports them. Fig. 4 is a horizontal section of the wheel, disk, and leading curves; and Fig. 5 is an elevation of one of the leading curves.

The same small letters in all the figures refer to the same parts.

$h\,h$, &c., is the frame for sustaining the penstock, flume, and turbine.

$p\,p$ is the penstock.

$k\,k$ is the flume.

The turbine consists of the water-wheel $w\,w$, including its lower ring $n\,n$, its upper ring $r\,r$, and floats or buckets $f\,f$, &c., and several appendages, as the shaft $s$, the annular gate $a\,a\,a$, the three rods $m\,m\,m$ for moving the gate, the leading curves $l\,l$, &c., the disk $d\,d$, the pipe or tube $t\,t$ for sustaining the disk, and other parts not necessary to mention.

My invention in the first place is in the upper and lower rings or rims of the wheel, which the floats are fastened to. The usual form of the rings, rims, or parts of the wheel $r\,r$ and $n\,n$, Fig. 3, is plain, and they usually are only wide enough to extend from the inner to the outer ends of the floats.

My improvement consists in adding the curved or bell-shaped parts $b\,b$ and $c\,c$, Figs. 1, 3, and 4, to the circumference of the rings $r\,r$ and $n\,n$, of turbine-wheels and reacting water-wheels. The wheel should be placed so low that the circumference of the upper bell-shaped part $b\,b$ will be as low or lower than the surface of the water about the wheel below the fall. When the wheel is working, the revolving of these bell-shaped adjuncts tend to keep the water which has passed out of the wheel and is still between these bell-shaped parts revolving, and the centrifugal force of this water and the momentum which the water has when it leaves the floats tends to diminish the pressure of the water or atmosphere on the circumference of the wheel or convex surfaces of the outer extremities of the floats, and thereby increasing the efficiency of the water in moving the wheel. The width of these bell-shaped parts should be about equal to the width of the rings or parts which the floats or buckets are fixed in, which extend from the inner to the outer extremities of the floats—that is, the distance $B'\,C'$, Fig. 4, between the inner and outer edges of the bell-shaped part should be about equal to $A'\,B'$, the distance between the inner and outer edges of the ring $r\,r$ or $n\,n$. The curve or flaring should commence at or near the outer extremities of the floats, and the distance between the circumferences or outer edges of these bell-shaped adjuncts should be about one-half greater than at the outer extremities of the floats, and the curvature of the upper side of the lower one and the lower side of the upper one should be all of the same radius and such that the angle which the outer extremities of these curves make with each other should be about twice as great as the angle which the inner parts of these curves at the ends of the floats make with each other.

I have above described the form which I think best for these bell-shaped parts or adjuncts; but some modifications of this form will answer nearly as well—for instance, the curvature of these adjuncts may be different from what I have described, or they may be conical, or one may be bell-shaped and the other plain—that is, flat—like the parts which the edges of the floats are fixed to; or these adjuncts may be made to flare by small steps, offsets, or irregularities, and when thus formed still operate, though imperfectly, excepting when these steps, offsets, or irregularities are very small, so as to approximate a gradual flaring or separation. It is essential that these adjuncts or rings flare, or that the space between them at their circumferences or outer extremities be greater than at or near the outer extremities of the floats. Instead of these adjuncts being made separately and fastened to the rings $r\ r$ and $n\ n$, these rings and adjuncts may be made of the same pieces of material—that is, the rings $r\ r$ and $n\ n$ may extend outward beyond the extremities of the floats, so as to form these bell-shaped parts or adjuncts.

In some cases the wheel of a turbine or a reacting wheel has one or more diaphragms between the upper and lower rings of the wheel which the floats are attached to. These diaphragms are annular and of about the same width and diameter as the width and diameter of the two rings of the wheel which the upper and lower edges of the floats are attached to, or the diaphragm is composed of pieces fastened between the floats, which pieces collectively form an annular partition in the wheel, which is parallel with the wheel, as is well known to people conversant with this kind of water-wheels. If wheels which have bell-shaped parts or adjuncts, as above described, have diaphragms, the diaphragms should extend outward about as far as the outer extremities of the bell-shaped parts or adjuncts—that is, the diameters of the diaphragms should be about as large as the diameters of the adjuncts. The circumferential parts of these diaphragms should be as thin as they can be and have sufficient strength to retain their form, and if the parts of them at the outer extremities of the floats be thick they should gradually diminish in thickness to their circumferences.

My invention, in the second place, consists in making a part of the tops of the leading curves $l\ l$, &c., Figs. 2, 3, and 5, sloping, the parts next the gate being higher than the other parts. The slope extends from the extremities of the leading curves next the annular gate to a little inward of the interior surface of the garniture—that is, the slope should extend to a little nearer the axle of the wheel than the garniture. This slope is shown most distinctly at $e$ in Fig. 5. This slope should make an angle of about forty-five degrees with the plane of the wheel. This slope may or may not be curved so that some parts of it will make a greater angle with the plane of the wheel than other parts. The object of making this part sloping is to prevent substances from passing and lodging between the leading curves and the garniture or gate, which sometimes obstruct the motion of the gate.

What I claim as my invention, and desire to secure by Letters Patent, is—

1. Fastening conical or bell-shaped rings to the circumferences or outer edges of the rings or rims of turbine-wheels and reacting water-wheels which the floats are attached to, or making the rings or rims which the floats are attached to of so large a diameter as to extend outward beyond the outer extremities of the floats or buckets, and making the part of one or both of the rings or rims which are outside of the floats curved, conical, bell-shaped, or of such other form that the distance between them at their exterior edges or circumferences shall be greater than at their parts next the outer extremities of the floats, as described above. I do not limit my claim exactly to the width or forms described above, but extend it to all forms which are essentially the same as those above described. I do not include in this claim placing bell-shaped rings around the circumferences of wheels detached and separate from the wheels, a patent having been issued to me for such dated November 1, 1846; but I claim these adjuncts so attached to the wheels as to revolve with the wheels, or so made as to be parts of the wheels.

2. Making the parts of the tops of the leading curves at and near the garniture sloping, as described above, though I do not confine my claim exactly to the angle of slope mentioned above, but extend it to all slopes of any angle, inclination, curvature, and extent which will in any degree answer the same purpose.

URIAH ATHERTON BOYDEN.

Witnesses:
 JOEL AMSDEN,
 HENRY PENNEY HALL.